US008639077B2

(12) United States Patent
Tanaka et al.

(10) Patent No.: US 8,639,077 B2
(45) Date of Patent: Jan. 28, 2014

(54) COLORED COATED OPTICAL FIBER

(71) Applicant: Furukawa Electric Co., Ltd., Tokyo (JP)

(72) Inventors: Hiroki Tanaka, Tokyo (JP); Yasuo Nakajima, Tokyo (JP); Kouji Mochizuki, Tokyo (JP); Yoshihiro Arashitani, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/754,985

(22) Filed: Jan. 31, 2013

(65) Prior Publication Data

US 2013/0266281 A1 Oct. 10, 2013

Related U.S. Application Data

(63) Continuation of application No. PCT/JP2011/005453, filed on Sep. 28, 2011.

(30) Foreign Application Priority Data

Nov. 24, 2010 (JP) ................................. 2010-261209

(51) Int. Cl.
*G02B 6/02* (2006.01)
*G02B 6/44* (2006.01)

(52) U.S. Cl.
USPC .......................................... 385/114; 385/128

(58) Field of Classification Search
USPC .................. 385/114, 123, 126–128, 141–145
See application file for complete search history.

(56) References Cited

U.S. PATENT DOCUMENTS

| 7,085,465 B2 | 8/2006 | Ono et al. |
| 7,551,825 B2 | 6/2009 | Nakajima et al. |
| 7,555,183 B2 | 6/2009 | Arashitani et al. |
| 7,729,564 B2 | 6/2010 | Nakajima et al. |

(Continued)

FOREIGN PATENT DOCUMENTS

| JP | 2925099 B2 | 7/1999 |
| JP | 2001-240433 A | 9/2001 |
| JP | 2002-255590 A | 9/2002 |
| JP | 2004-4423 A | 1/2004 |

OTHER PUBLICATIONS

International Preliminary Report on Patentability issued Jun. 20, 2013, in PCT/JP2011/005453, filed Sep. 28, 2011. (submitting English translation only).

(Continued)

*Primary Examiner* — Ryan Lepisto
*Assistant Examiner* — Erin Chiem
(74) *Attorney, Agent, or Firm* — Oblon, Spivak, McClelland, Maier & Neustadt, L.L.P.

(57) ABSTRACT

The present invention provides a colored coated optical fiber which hardly has an increase in transmission loss even when immersed in water. A colored coated optical fiber according to one embodiment of the present invention includes a glass optical fiber, a primary coating layer covering the glass optical fiber, a secondary coating layer covering the primary coating layer, and a colored layer covering the secondary coating layer. A ratio of a thermal expansion coefficient of a laminate including the secondary coating layer and the colored layer covering the secondary coating layer to that of the secondary coating layer is 0.98 or more and 1.03 or less. A ratio of a glass transition temperature based on a dynamic viscoelasticity within a temperature range from –100° C. to 150° C. of the laminate to that of the secondary coating layer is 0.96 or more and 1.03 or less.

2 Claims, 3 Drawing Sheets

(56) References Cited

U.S. PATENT DOCUMENTS

| | | |
|---|---|---|
| 7,876,991 B2 | 1/2011 | Nakajima et al. |
| 7,978,948 B2 | 7/2011 | Nakajima et al. |
| 8,111,964 B2 | 2/2012 | Nakajima et al. |
| 8,295,666 B2 | 10/2012 | Nakajima et al. |
| 2008/0212925 A1 | 9/2008 | Arashitani et al. |
| 2009/0052847 A1 | 2/2009 | Arashitani et al. |
| 2009/0123749 A1 | 5/2009 | Ui et al. |
| 2010/0266257 A1 | 10/2010 | Nakajima et al. |
| 2011/0059236 A1 | 3/2011 | Ui et al. |
| 2011/0274396 A1 | 11/2011 | Nakajima et al. |
| 2012/0008907 A1 | 1/2012 | Nakamura et al. |
| 2012/0189257 A1 | 7/2012 | Kasahara et al. |

OTHER PUBLICATIONS

Written Opinion of the International Searching Authority issued Oct. 25, 2011, in PCT/JP2011/005453, filed Sep. 28, 2011. (submitting English translation only).

International Search Report mailed on Oct. 25, 2011, issued for International Application No. PCT/JP2011/005453, filed on Sep. 28, 2011 (with English translation of Categories).

International Written Opinion mailed on Oct. 25, 2011, issued for International Application No. PCT/JP2011/005453, filed on Sep. 28, 2011.

COLORED COATED OPTICAL FIBER

CROSS-REFERENCES TO RELATED APPLICATIONS

This application is a continuation application of International Application No. PCT/JP2011/005453, filed Sep. 28, 2011, which claims the benefit of Japanese Patent Application No. 2010-261209, filed Nov. 24, 2010. The contents of the aforementioned applications are incorporated herein by reference in their entireties.

TECHNICAL FIELD

The present invention relates to a colored coated optical fiber accommodated in an optical fiber cable. Specifically, the present invention relates to a colored coated optical fiber which suppresses an increase in transmission loss of an optical fiber due to an operating environment and aged deterioration. Particularly, the present invention relates to a colored coated optical fiber which hardly has an increase in transmission loss even when immersed in water for an extended period of time.

BACKGROUND ART

In a drawing process of quartz glass for manufacturing an optical fiber, a coating resin is immediately applied to the circumference of an optical fiber to prevent reduction in strength of the optical fiber. For the identification, a colored layer is provided. A UV curing resin is mainly used as the coating resin for an optical fiber. A urethane acrylate or epoxy acrylate is used as the UV curing resin.

In an optical fiber, transmission losses are increased by various external stresses and microbending caused thereby. For this reason, to protect the optical fiber from such external stresses, an optical fiber strand is generally provided with a coating having a two-layer structure including a soft layer and a hard layer. A soft resin having a relatively low Young's modulus is used for the inner layer, which is into contact with quartz glass, as a buffer layer (hereinafter, primary layer), while a hard resin having a relatively high Young's modulus is used for the outer layer as a protective layer (hereinafter, secondary layer). Generally, a resin having a Young's modulus of 3 MPa or less is used for the primary layer, and a resin having a Young's modulus of 500 MPa or more is used for the secondary layer.

In a method of manufacturing an optical fiber, a preform mainly containing quartz glass is melted by heating in a drawing furnace, and a quartz glass optical fiber is drawn from the preform. Then, a liquid UV curing resin is applied to the quartz glass optical fiber using a coating die. Subsequently, the resultant is irradiated with UV rays to cure the UV curing resin. By such a method, the optical fiber is coated with the primary layer and the secondary layer, and thereby an optical fiber strand is manufactured. Furthermore, in the subsequent step, the circumference of the optical fiber strand thus obtained is coated with a coating layer made of a colored resin. Hence, a colored coated optical fiber is manufactured.

In this description, such a glass optical fiber coated with a primary layer and a secondary layer is referred to as an optical fiber strand; an optical fiber strand whose circumference is further coated with a coating layer made of a colored resin is referred to as a colored coated optical fiber; furthermore, multiple colored coated optical fibers arranged on a plane and collectively coated with a ribbon resin are referred to as an optical fiber ribbon.

Meanwhile, in order to manufacture a highly reliable colored coated optical fiber which prevents an increase in transmission loss even when used under an immersed condition in 60° C. hot water, Patent Literature 1 proposes to increase the Young's modulus of a colored layer higher than the Young's modulus of a secondary layer, and to increase the glass transition temperature of the colored layer higher than the glass transition temperature of the secondary layer.

CITATION LIST

Patent Literatures

PTL 1: Japanese Patent Application Laid-Open No. 2002-255590
PTL 2: Japanese Patent No. 2925099

SUMMARY OF INVENTION

With recent remarkable spread of optical fibers, the applicable range of optical fiber cables is expanding. The long-term reliability required for optical fiber cables is becoming very stringent. For this reason, demanded is a colored coated optical fiber which is more and more unlikely to have an increase in transmission loss even when used under an immersed condition in water.

However, there is a limit to handling the above-described problems while achieving a balance in adhesive force at the interface between layers. Even when the colored coated optical fiber described in Patent Literature 1 is used, the long-term reliability thereof is insufficient.

An object of the present invention is to provide a colored coated optical fiber which hardly has an increase in transmission loss even when immersed in water.

In order to achieve such an object, the present invention is a colored coated optical fiber characterized as follows. Specifically, the colored coated optical fiber includes: a glass optical fiber; a primary coating layer covering the glass optical fiber; a secondary coating layer covering the primary coating layer; and a colored layer covering the secondary coating layer. A ratio of a thermal expansion coefficient of a laminate including the secondary coating layer and the colored layer covering the secondary coating layer to that of the secondary coating layer is 0.98 or more and 1.03 or less. A ratio of a glass transition temperature based on a dynamic viscoelasticity within a temperature range from −100° C. to 150° C. of the laminate to that of the secondary coating layer is 0.96 or more and 1.03 or less.

The present invention makes it possible to provide a colored coated optical fiber which hardly has an increase in transmission loss even when used under an immersed condition in water.

DESCRIPTION OF EMBODIMENTS

Figure 1:
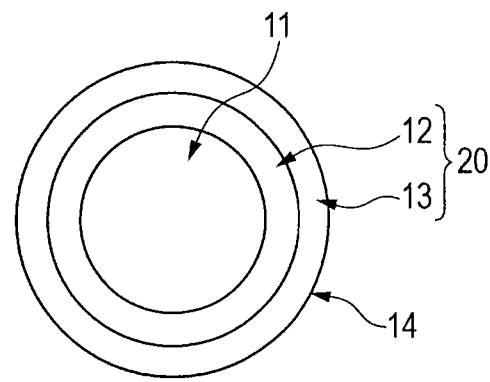
FIG. 1 is a cross-sectional view of an optical fiber strand according to one embodiment of the present invention.

Hereinafter, embodiments of the present invention will be described in detail with reference to the drawings. Note that, in the drawings to be described below, the same reference numerals denote elements having the same function, and repetitive description will be omitted. As a result of earnest study on the cause of an increase in transmission loss of a coated optical fiber exposed to a water-immersed condition, it has been discovered that peeling at the interface between a glass optical fiber and a primary layer, that is, delamination is observed in a coated optical fiber whose transmission loss has been increased. Further, it has been discovered that peeling is observed also at the interface between a secondary layer and a colored layer or interface between the colored layer and a ribbon layer.

Delamination occurs when a force to peel the coating layer at the interface between the glass optical fiber and the coating layer exceeds an adhesive force at the interface between the glass optical fiber and the coating layer. Moreover, when a nonuniform force is applied to the glass optical fiber, transmission loss occurs.

As an embodiment for carrying out the present invention, an optical fiber strand is manufactured in which a glass optical fiber is coated with a primary layer and a secondary layer. The optical fiber strand is coated with a colored layer to manufacture a colored coated optical fiber. As a resin used for the coating layers, a UV curing resin is used. Further, multiples of the colored coated optical fibers are arranged in parallel on a plane and collectively coated with a ribbon resin made of a UV curing resin, and it is thereby possible to form an optical fiber ribbon.

Figure 2:
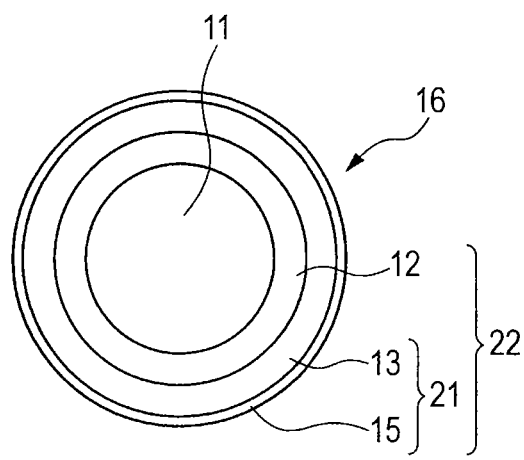
FIG. 2 is a cross-sectional view of a colored coated optical fiber according to one embodiment of the present invention.
Figure 3:
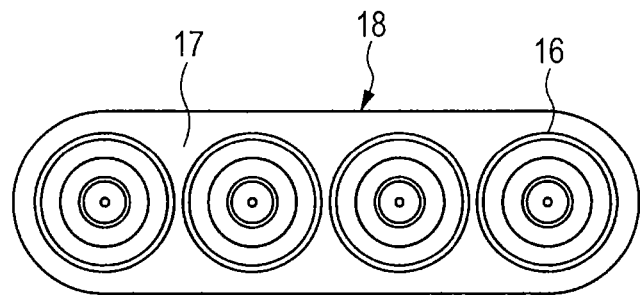
FIG. 3 is a cross-sectional view of an optical fiber ribbon according to one embodiment of the present invention.

FIG. 1 is a cross-sectional view of an optical fiber strand 14 according to one embodiment of the present invention. FIG. 2 is a cross-sectional view of a colored coated optical fiber 16 according to one embodiment of the present invention. FIG. 3 is a cross-sectional view of an optical fiber ribbon 18 according to one embodiment of the present invention.

In FIG. 1, the optical fiber strand 14 includes a glass optical fiber 11 and a coating layer 20 covering the glass optical fiber 11. The coating layer 20 includes: a primary layer (hereinafter, may also be referred to as "primary coating layer") 12 covering the glass optical fiber 11; and a secondary layer (hereinafter, may also be referred to as "secondary coating layer") 13 covering the primary coating layer 12. The primary coating layer 12 is a soft resin and accordingly has a relatively low Young's modulus. Meanwhile, the secondary coating layer 13 is a hard resin and accordingly has a higher Young's modulus than that of the primary coating layer 12. Note that since the secondary coating layer 13 is formed on the primary coating layer 12, the coating layer 20 can be said as a laminate in which the primary coating layer 12 and the secondary coating layer 13 are laminated in this order in a cylindrical form.

Moreover, in FIG. 2, the colored coated optical fiber 16 includes the glass optical fiber 11 and a coating layer 22 covering the glass optical fiber 11. The coating layer 22 includes the primary coating layer 12, the secondary coating layer 13, and a colored layer 15 covering the secondary coating layer 13. In other words, the colored coated optical fiber 16 has a structure in which the optical fiber strand 14 is coated with the colored layer 15. Note that since the secondary coating layer 13 is formed on the primary coating layer 12 and the colored layer 15 is further formed on the secondary coating layer 13, the coating layer 22 can be said as a laminate in which the primary coating layer 12, the secondary coating layer 13, and the colored layer 15 are laminated in this order in a cylindrical form. Further, in FIG. 2, reference numeral 21 denotes a laminate of the secondary coating layer 13 and the colored layer 15 formed to cover the secondary coating layer 13.

Furthermore, in FIG. 3, the optical fiber ribbon 18 includes multiples of the colored coated optical fibers 16 arranged on a plane, and a ribbon resin 17 covering the multiples of the colored coated optical fibers 16 arranged on the plane.

Note that a coating resin used as the raw material for the primary coating layer 12 and the secondary coating layer 13 of the optical fiber strand 14 as well as a UV curing resin used as a colored resin serving as the raw material for the colored layer 15 of the colored coated optical fiber 16 mainly contains, for example, an oligomer, a diluted monomer, a photoinitiator, a silane coupling agent, a sensitizer, a pigment, and various additives. As the oligomer, polyether urethane acrylate, epoxy acrylate, polyester acrylate, silicone acrylate, or the like is mainly used. As the diluted monomer, a monofunctional monomer or a multifunctional monomer is used.

One characteristic of the present invention is that in the colored coated optical fiber 16 having the colored layer 15 on the circumference of the optical fiber strand 14 including the glass optical fiber 11, the primary coating layer 12 formed on the glass optical fiber 11, and the secondary coating layer 13, a ratio of a thermal expansion coefficient of the laminate 21 including the secondary coating layer 13 and the colored layer 15 to that of the secondary coating layer 13 is from 0.98 to 1.03 both inclusive.

In addition, another characteristic of the present invention is that a ratio of a glass transition temperature Tg based on a dynamic viscoelasticity within a temperature range from −100° C. to 150° C. of a laminate 21 including the secondary coating layer 13 and the colored layer 15 to that of the secondary coating layer 13 is from 0.96 to 1.03 both inclusive.

In the present invention, the two characteristics make it possible to suppress internal distortion between the secondary coating layer as the secondary layer and the colored layer when immersed in water.

Specifically, according to the colored coated optical fiber of the present invention, the first characteristic makes it possible to expand and contract the secondary coating layer 13 and the colored layer 15 in the same manner when the temperature changes or when the colored coated optical fiber 16 is immersed in hot water, reducing internal distortion between the secondary coating layer 13 and the colored layer 15. Thereby, displacement of the bonding surfaces of the secondary coating layer 13 and the colored layer 15 can be reduced. Thus, it is possible to reduce damage at the interface between the glass optical fiber 11 and the coating resin, such as the interface between the glass optical fiber 11 and the primary coating layer 12, which contributes to an increase in transmission loss, and to suppress delamination which causes the loss increase.

In addition, the second characteristic also makes it possible to expand and contract both of the secondary coating layer 13 and the colored layer 15 in the same manner when the temperature changes or when the colored coated optical fiber 16 is immersed in hot water, thereby reducing internal distortion between the secondary coating layer 13 and the colored layer 15. Thus, it is possible to suppress a force to peel the primary coating layer 12 from the glass optical fiber 11 at the interface between the glass optical fiber 11 and the primary coating layer 12 as the primary layer.

Meanwhile, when the colored coated optical fiber 16 is immersed in water, the water may pass through the colored layer 15 and may intrude into the secondary coating layer 13 and the primary coating layer 12, and as a result, peeling and delamination may occur in some cases at a portion where an adhesive force is weak at the interface between the glass optical fiber 11 and the primary coating layer 12. In this manner, once delamination occurs, the influence of osmotic pressure is exerted on the delaminated portion in such a manner as to reduce the concentration to take up a lot of water. However, by matching the secondary coating layer 13 with the colored layer 15 in terms of glass transition temperature and thermal expansion coefficient, it is possible to prevent accumulation of water into the colored coated optical fiber 16.

For example, in Patent Literature 1, a primary layer, a secondary layer, and a colored layer are arranged in such a manner that the Young's modulus and the glass transition temperature are increased from the inside to the outside. This aims to reduce nonuniform transmission of an internal stress attributable to, for example, distortion of each coating layer, making it possible to suppress peeling at a portion between layers where an adhesive force is weak and formation of a blister. Nevertheless, with such an arrangement that the colored layer has a higher Young's modulus than the secondary layer, and that the colored layer has a higher glass transition temperature than the secondary layer, internal distortion is likely to occur at the interface between the secondary layer and the colored layer.

In addition, there is a tendency that: the higher the Young's modulus, the lower the thermal expansion coefficient. Hence, when the colored coated optical fiber disclosed in Patent Literature 1 is immersed in hot water, internal distortion may occur at the interface between the secondary layer and the colored layer. The internal distortion causes peeling and delamination in some cases at a portion where an adhesive force is weak at the interface between the glass optical fiber and the primary layer. Once an eluted component is accumulated at the delaminated portion, osmotic pressure is exerted in such a manner as to reduce the concentration to take up a lot of water as described in Patent Literature 2. However, it can be inferred that in the colored coated optical fiber disclosed in Patent Literature 1, the presence of the colored layer having a high Young's modulus creates a condition where water accumulated into the colored coated optical fiber cannot go outside the colored coated optical fiber.

Conventionally, a colored layer has a high cross-link density, while a secondary layer has a low cross-link density. Accordingly, once water passes through the colored layer and enters the inside, the water having intruded into the inside is intercepted by the colored layer having a high cross-link density, and hardly goes outside from the colored layer. In other words, conventionally, water enters the colored coated optical fiber, and the water thus entered hardly goes outside. In contrast, in the present invention, the secondary coating layer 13 and the colored layer 15 have almost the same glass transition temperature and thermal expansion coefficient. Accordingly, even if water passes through the colored layer 15 and enters the inside of the colored coated optical fiber 16, the water thus entered readily passes through the colored layer 15. In other words, water can go inside and outside the colored layer 15. Accordingly, even if water unexpectedly enters the inside of the colored coated optical fiber 16, the water thus entered is easily discharged to the outside. It is made difficult to exert osmotic pressure in the colored coated optical fiber 16.

As described above, in the present invention, it is important that the secondary coating layer 13 and the colored layer 15 expand and contract in the same manner when the temperature changes. For this purpose, the secondary coating layer 13 and the colored layer 15 are made to have the same or almost the same thermal expansion coefficient and glass transition temperature. To achieve this, the present invention focuses on the secondary coating layer 13 and the laminate 21, and the first and second characteristics are employed as indicators to make the secondary coating layer 13 and colored layer 15 have almost the same thermal expansion coefficient and glass transition temperature.

Between the secondary coating layer 13 and the laminate including the secondary coating layer 13 and the colored layer 15 in the present invention, suppose the colored layer 15 and the secondary coating layer 13 greatly differ from each other in thermal expansion coefficient and glass transition temperature. In this case, the secondary coating layer 13 and the laminate also greatly differ from each other in thermal expansion coefficient and glass transition temperature. Meanwhile, when the colored layer 15 and the secondary coating layer 13 have almost the same thermal expansion coefficient and glass transition temperature, the secondary coating layer 13 and the laminate 21 should have almost the same thermal expansion coefficient and glass transition temperature. In the present invention, it is important that both of the secondary coating layer 13 and the colored layer 15 expand and contract in the same manner, and that the secondary coating layer 13 and the colored layer 15 have almost the same thermal expansion coefficient and glass transition temperature. As described above, the thermal expansion coefficients and glass transition temperatures of the secondary coating layer 13 and the laminate 21 are linked to the thermal expansion coefficients and glass transition temperatures of the secondary coating layer and the colored layer 15. Accordingly, in the present invention, whether the secondary coating layer 13 has almost the same thermal expansion coefficient and glass transition temperature as those of the colored layer 15 is indirectly determined using the thermal expansion coefficients and glass transition temperatures of the secondary coating layer 13 and the laminate 21 as the indicators.

EXAMPLES

As the present examples, the optical fiber strand 14 was manufactured in which the glass optical fiber 11 made of quartz glass in FIG. 1 was coated with a coating resin layer (coating layer 20) including two layers of the primary coating layer 12 and the secondary coating layer 13. As each of the resins, a UV curing resin was used. The UV curing resin contained an oligomer, a diluted monomer, a photoinitiator, a chain transfer agent, and an additive. By changing constituent materials, several optical fiber strands 14 were obtained. Moreover, the colored coated optical fiber 16 as shown in FIG. 2 was obtained. Specifically, the optical fiber 14 was manufactured in which: the glass optical fiber 11 made of quartz glass had an outer diameter of 125 µm; the primary coating layer 12 had an outer diameter of 183 µm and 196 µm; and the secondary coating layer 13 had an outer diameter of 245 µm. Then, in another step, the optical fiber 14 was coated with the colored layer 15 to obtain the colored coated optical fiber 16 having an outer diameter of 255 µm. Note that in order to retain the properties as the optical fiber strand 14, the following dimensions are normally employed: the outer diameter of the glass optical fiber 11 is 80 µm to 125 µm; the outer diameter of the primary coating layer 12 is 120 µm to 200 µm; the outer diameter of the secondary coating layer 13 is 165 µm to 245 µm; and the outer diameter of the colored layer 15 (colored coated optical fiber 16) is 135 µm to 255 µm.

Further, four colored coated optical fibers 16 thus obtained were arranged in parallel on a plane as shown in FIG. 3 and collectively coated with the ribbon resin 17 made of a UV curing resin to thus form the optical fiber ribbon 18.

Note that the adhesive force between the glass optical fiber 11 and the primary coating layer 12 of the optical fiber strand 14 used in the present invention was 5 N to 20 N. Here, in the method of measuring the adhesive force, Pullout force in 48th International Wire and Cable Symposium "Polymer coatings For Optical fibers" was used. The speed of 5 mm/min was employed.

If formed with a composition equivalent to that of the coating resin used for the secondary coating layer 13, the colored layer 15 can have almost the same thermal expansion coefficient as that of the secondary coating layer 13. In this case, it is concerned that the degree of cure of the UV curing resin used for the colored layer 15 may be decreased. Nevertheless, this is adjustable by changing the kind of photoinitiator or increasing the amount to be added. In the present examples, an alkylphenone-based photopolymerization initiator or acylphosphine oxide-based photopolymerization initiator was added as the photoinitiator of the UV curing resin used for the colored layer. In addition, by using a monofunctional monomer such as isobornyl acrylate, the Young's modulus can be increased without increasing the glass transition temperature.

(Method of Measuring Thermal Expansion Coefficient)

A method of determining a thermal expansion coefficient (volumetric expansion coefficient) will be described. To measure the thermal expansion coefficients of the secondary coating layer 13 of the optical fiber strand 14 and the laminate 21 of the colored coated optical fiber 16, two types of coating samples were prepared for each of the secondary coating layer 13 and the laminate 21. One is a fiber sample (the optical fiber strand 14 or the colored coated optical fiber 16) in which a glass optical fiber is coated with a coating layer (the coating layer 20 or the coating layer 22). Meanwhile, the other is a tubular coating sample of only a coating layer (the coating layer 20 or the coating layer 22) obtained by pulling out the glass optical fiber from the fiber sample (the optical fiber strand 14 or the colored coated optical fiber 16). The thermal expansion coefficient was measured in a longitudinal direction and in an outer diameter direction using TMA thermomechanical analysis (Mettler Toledo, TMA-40). The measuring conditions were: 0 loads added, a temperature range from −100° C. to 100° C., and a rate of temperature rise of 10° C./min. The measurement in the longitudinal direction was performed using the tubular coating sample by a tensile mode. The measurement in the outer diameter direction was performed using the fiber sample by a compressive mode under a condition where the fiber sample included the glass optical fiber. Since the linear expansion coefficient of the coating layer varies considerably at around the glass transition point of the coating layer, it is preferable to set the temperature range for the measurement within a range including all of the glass transition points of the coating layer.

Figure 4:
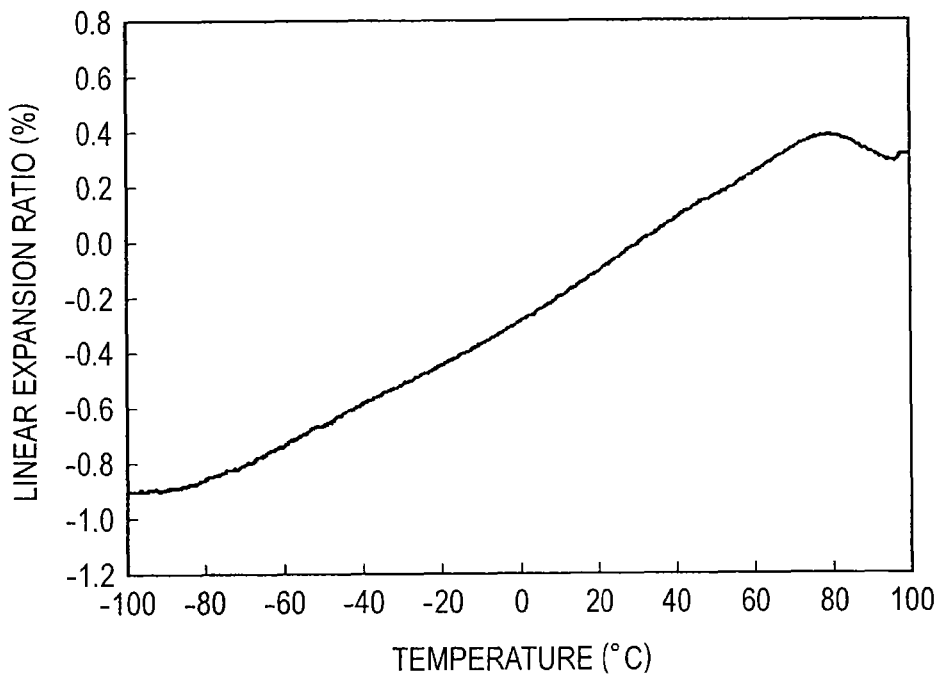
FIG. 4 is a graph for illustrating the temperature dependence of the linear expansion ratio of a tubular coating sample according to one embodiment of the present invention.
Figure 5:
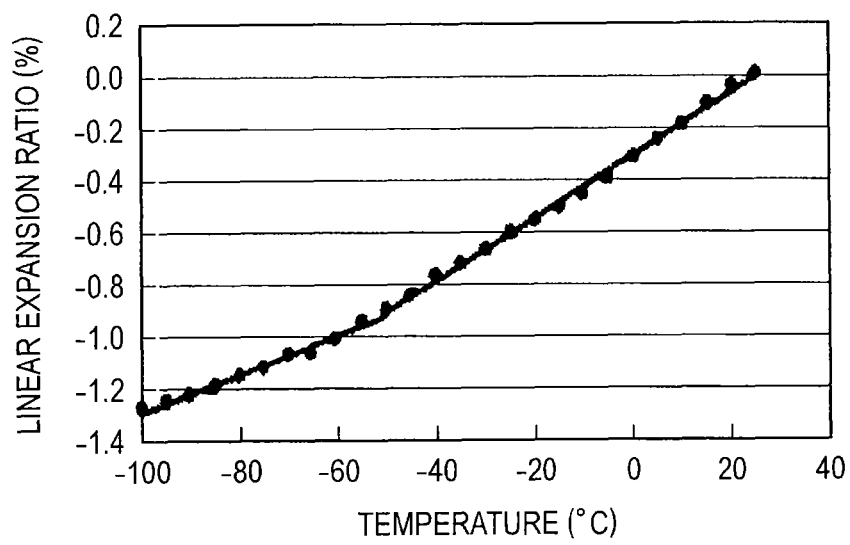
FIG. 5 is a graph for illustrating the temperature dependence of the linear expansion ratio of a fiber sample according to one embodiment of the present invention.

FIG. 4 shows a relation between the temperature and the linear expansion ratio in the longitudinal direction thus measured. FIG. 5 shows a relation between the temperature and the linear expansion ratio in the outer diameter direction. Each linear expansion coefficient was determined from the range where the measurement results changed linearly, that is, from the slope of the temperature range from −50 to 25° C.

Normally, the primary coating layer 12 (primary layer) has a low glass transition temperature of approximately −50° C. In the temperature range from and above the glass transition temperature, the primary coating layer (primary layer) of the tubular coating sample has a Young's modulus significantly lower than those of the secondary coating layer 13 (secondary layer) and the colored layer 15. Accordingly, the secondary coating layer 13 in the coating layer 20 and the secondary coating layer 13 and the colored layer 15 in the coating layer 22 can freely expand and contract.

In other words, it can be said that the volumetric expansion coefficient of the coating layer 20 is almost the same as the volumetric expansion coefficient of the secondary coating layer 13. In addition, it can be said that the volumetric expansion coefficient of the coating layer 22 is almost the same as the volumetric expansion coefficient of the laminate 21 including the secondary coating layer 13 and the colored layer 15. Thus, the volumetric thermal expansion coefficients can be determined from the respective linear expansion coefficients of the secondary coating layer 13 and the laminate 21 using Formula 1).

$$\beta s = \alpha SL + 2 \times \alpha SR \qquad 1)$$

βs: the volumetric expansion coefficient of the secondary coating layer 13 or the laminate 21

αSL: the linear expansion coefficient in the longitudinal direction of the secondary coating layer 13 or the laminate 21

αSR: the linear expansion coefficient in the outer diameter direction of the secondary coating layer 13 or the laminate 21

As to the volumetric expansion coefficients thus calculated, in Table 1, the volumetric expansion coefficient of the secondary coating layer 13 for each Example is recorded in the column of "volumetric expansion coefficient of secondary coating layer," and the volumetric expansion coefficient of the laminate 21 is recorded in the column of "volumetric expansion coefficient of laminate."

(Method of Measuring Glass Transition Temperatures of Secondary Coating Layer 13 and Laminate 21)

Figure 6:
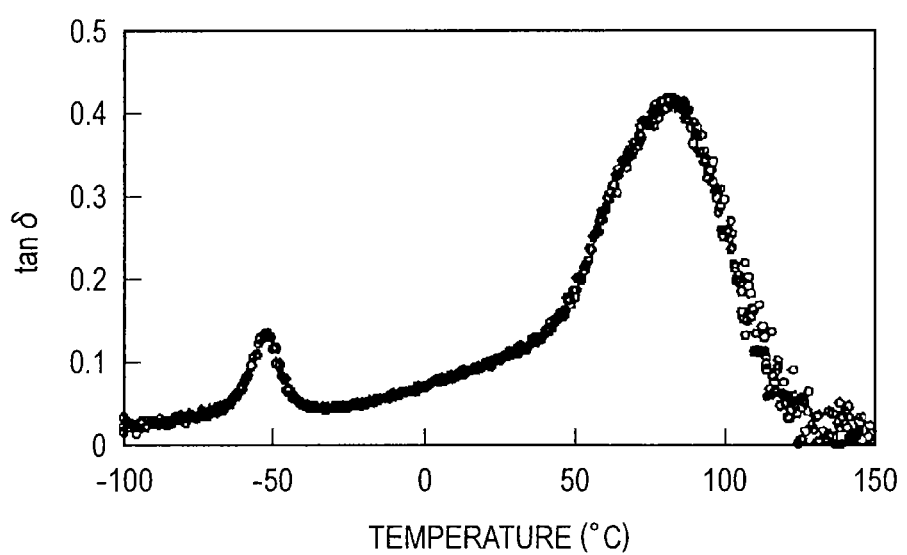
FIG. 6 is a graph for explaining how to determine a glass transition temperature according to one embodiment of the present invention.

A method of determining a glass transition temperature Tg will be described. DMA dynamic mechanical analysis (TA Instruments, RSA3) was used to measure the glass transition temperatures Tg of the secondary coating layer 13 and the laminate 21. The glass transition temperature was defined as a temperature at which the maximum value of tan δ appeared as shown in FIG. 6. The measurement was performed using the tubular coating sample by a tensile test under conditions of a mark distance of 20 mm, a frequency of 1 Hz, and a rate of temperature rise of 2° C./min. Note that when the tubular coating sample is measured within the temperature range from −100° C. to 150° C., two tan δ peaks appears on a low-temperature side and a high-temperature side. One on the low-temperature side represents the glass transition temperature of the primary coating layer 12 (primary layer), while one on the high-temperature side represents the glass transition temperature of the secondary coating layer 13 or the colored layer 15.

As to the glass transition temperatures thus obtained, in Table 1, the glass transition temperature of the secondary coating layer 13 for each Example is recorded in the column of "glass transition temperature of secondary coating layer," and the glass transition temperature of the laminate 21 is recorded in the column of "glass transition temperature of laminate."

(Method of Measuring Transmission Loss)

An optical fiber strand or a colored coated optical fiber having a length of approximately 1 km was obtained using the manufactured optical fiber strand 14 and colored coated optical fiber 16, and was immersed in 60° C. hot water. The transmission loss after the immersion was measured. The transmission loss was measured using an optical pulse tester MW9076B manufactured by Anritsu Corporation, by measuring the transmission loss of a wavelength of 1.55 μm in a longitudinal direction on the basis of backward scattering loss coefficient of light (OTDR). Then, the water temperature was increased to 60° C., and the immersion was continued for 90 days. After that, when the transmission loss was recognized as being increased by 0.1 dB/km or more, the resistance to the operating environment was determined to be insufficient, and marked by x in Table 1.

the following effects were obtained that: even when the colored coated optical fiber is immersed in 60° C. hot water for 30 days, the transmission loss is not increased; furthermore, even when the colored coated optical fiber is immersed in 60° C. hot water for 90 days, the transmission loss is not increased.

From the above results, in a case where a secondary coating layer and a colored layer differ from each other in thermal expansion, when the temperature changes, distortion occurs at the interface between the secondary coating layer and the

TABLE 1

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Young's modulus of primary coating layer (MPa) | 0.8 | 0.8 | 0.7 | 0.7 | 0.6 | 0.6 | 0.7 | 0.8 | 0.6 | 0.8 | 0.7 |
| Young's modulus of secondary coating layer (MPa) | 900 | 900 | 710 | 710 | 600 | 600 | 710 | 900 | 600 | 900 | 710 |
| Young's modulus of laminate (secondary coating layer + colored layer) (MPa) | 930 | 900 | 710 | 740 | 730 | 700 | 810 | 700 | 880 | 1400 | 1300 |
| Outer diameter of primary coating layer (μm) | 195 | 195 | 196 | 196 | 183 | 183 | 196 | 195 | 183 | 195 | 196 |
| Volumetric expansion coefficient of secondary coating layer ($\times 10^{-4}$ $K^{-1}$) | 2.72 | 2.72 | 2.68 | 2.68 | 2.52 | 2.52 | 2.68 | 2.72 | 2.52 | 2.72 | 2.68 |
| Volumetric expansion coefficient of laminate ($\times 10^{-4}$ $K^{-1}$) | 2.68 | 2.70 | 2.72 | 2.75 | 2.52 | 2.47 | 2.61 | 2.60 | 2.43 | 2.39 | 2.80 |
| Laminate /secondary coating layer (volumetric expansion coefficient) | 0.99 | 0.99 | 1.01 | 1.03 | 1.00 | 0.98 | 0.97 | 0.96 | 0.96 | 0.88 | 1.04 |
| Glass transition temperature of secondary coating layer (° C.) | 85 | 85 | 82 | 82 | 75 | 75 | 82 | 85 | 75 | 85 | 82 |
| Glass transition temperature of laminate (° C.) | 85 | 86 | 84 | 80 | 77 | 72 | 86 | 81 | 82 | 93 | 95 |
| Laminate/secondary coating layer (glass transition temperature) | 1.00 | 1.01 | 1.02 | 0.98 | 1.03 | 0.96 | 1.05 | 0.95 | 1.09 | 1.09 | 1.16 |
| Transmission loss increase in 60° C. water 30 days at 1550 nm (dB/km), | 0.00 | 0.00 | 0.00 | 0.00 | 0.00 | 0.00 | 0.02 | 0.00 | 0.07 | 0.15 | 0.24 |
| Transmission loss increase in 60° C. water 90 days at 1550 nm (dB/km), | 0.00 | 0.00 | 0.00 | 0.00 | 0.00 | 0.00 | 0.09 | 0.05 | 0.15 | 0.31 | 0.55 |
| Determination | ○ | ○ | ○ | ○ | ○ | ○ | Δ | Δ | x | x | x |

As is clear from the above description, the colored coated optical fiber of the present invention is a colored coated optical fiber in which an optical fiber strand including a glass optical fiber coated with two coating layers including a primary coating layer as a primary layer and a secondary coating layer as a secondary layer is further coated with a coating layer made of a colored resin. The ratio of the thermal expansion coefficient of the laminate 21 (the secondary coating layer 13+the colored layer 15) to that of the secondary coating layer 13 is 0.98 or more and 1.03 or less. The ratio of the glass transition temperature Tg based on a dynamic viscoelasticity within the temperature range from −100° C. to 150° C. of the laminate (secondary coating layer 13+colored layer 15) to that of the secondary coating layer 13 is 0.96 or more and 1.03 or less. Hence, as shown in Table 1, in the present examples, colored layer. When a nonuniform force is generated to the coating layer, the nonuniform force is applied to a glass optical fiber and a primary coating layer, causing peeling at an interface therebetween as well as the loss increase. Against this, the laminate 21 (the secondary coating layer 13+the colored layer 15) and the secondary coating layer 13 desirably have equal or approximately equal thermal expansion coefficient and glass transition temperature.

The invention claimed is:
1. A colored coated optical fiber comprising: a glass optical fiber;
   a primary coating layer covering the glass optical fiber;
   a secondary coating layer covering the primary coating layer; and a colored layer covering the secondary coating layer, wherein a ratio of a thermal expansion coefficient of a laminate including the secondary coating layer and the colored layer covering the secondary coating layer to that of the secondary coating layer is 0.98 or more and 1.03 or less, and a ratio of a glass transition temperature based on a dynamic viscoelasticity within a temperature range from −100° C. to 150° C. of the laminate to that of the secondary coating layer is 0.96 or more and 1.03 or less;

wherein the secondary layer includes a photoinitiator having one of an alkylphenone-based photopolymerization initiator and an acylphosphine oxide-based photopolymerization initiator.

2. An optical fiber ribbon comprising a plurality of the colored coated optical fibers according to claim 1 arranged and collected using a ribbon resin.

\* \* \* \* \*